United States Patent [19]

Woodhall et al.

[11] Patent Number: 4,972,994
[45] Date of Patent: Nov. 27, 1990

[54] OPERATIONAL MODE CONVERSION FOR PRESSURE WASHER SPRAY

[75] Inventors: Michael B. Woodhall, Berkshire; Michael F. Standley, Hertfordshire, both of England

[73] Assignee: Shop-Vac Corp., Williamsport, Pa.

[21] Appl. No.: 378,386

[22] Filed: Jul. 11, 1989

[51] Int. Cl.⁵ .............................................. F04B 21/00
[52] U.S. Cl. .................................................... 239/390
[58] Field of Search ........................ 239/525, 530, 390

[56] References Cited

U.S. PATENT DOCUMENTS

| | | | |
|---|---|---|---|
| 4,045,386 | 9/1977 | Glenn | 15/4 |
| 4,437,525 | 3/1984 | O'Hanlon et al. | 175/218 |
| 4,813,611 | 3/1989 | Fontana | 234/590.5 X |

Primary Examiner—Andres Kashnikow
Assistant Examiner—Kevin Weldon
Attorney, Agent, or Firm—Ostrolenk, Faber, Gerb & Soffen

[57] ABSTRACT

In a liquid pumping apparatus, such as a pressure washer, the outlet is selectively connectable to one of two different conduits. The pump for the apparatus is an electric pump and is connected with an electric switch. A manually operable button operates the switch between its pump activated and pump inactivated positions. A spring is selectively urged against the switch lever to bias the switch lever to the pump inactivated position through a pivoting plate. The pivoting plate is pivoted toward or causes the spring to bias the switch lever by a tang extending from one of the conduits for transmitting liquid from the apparatus outlet. Operation of the pump then requires continuous pushing on the switch operating button by the operator. With a different conduit in place and/or no contact of the tang with the spring contacting plate, the spring relaxes away from abutting the switch lever. The switch operating button is manually movable to the pump activated position and the button and the switch lever will remain in that position until manually returned to the pump inactivated position.

14 Claims, 3 Drawing Sheets

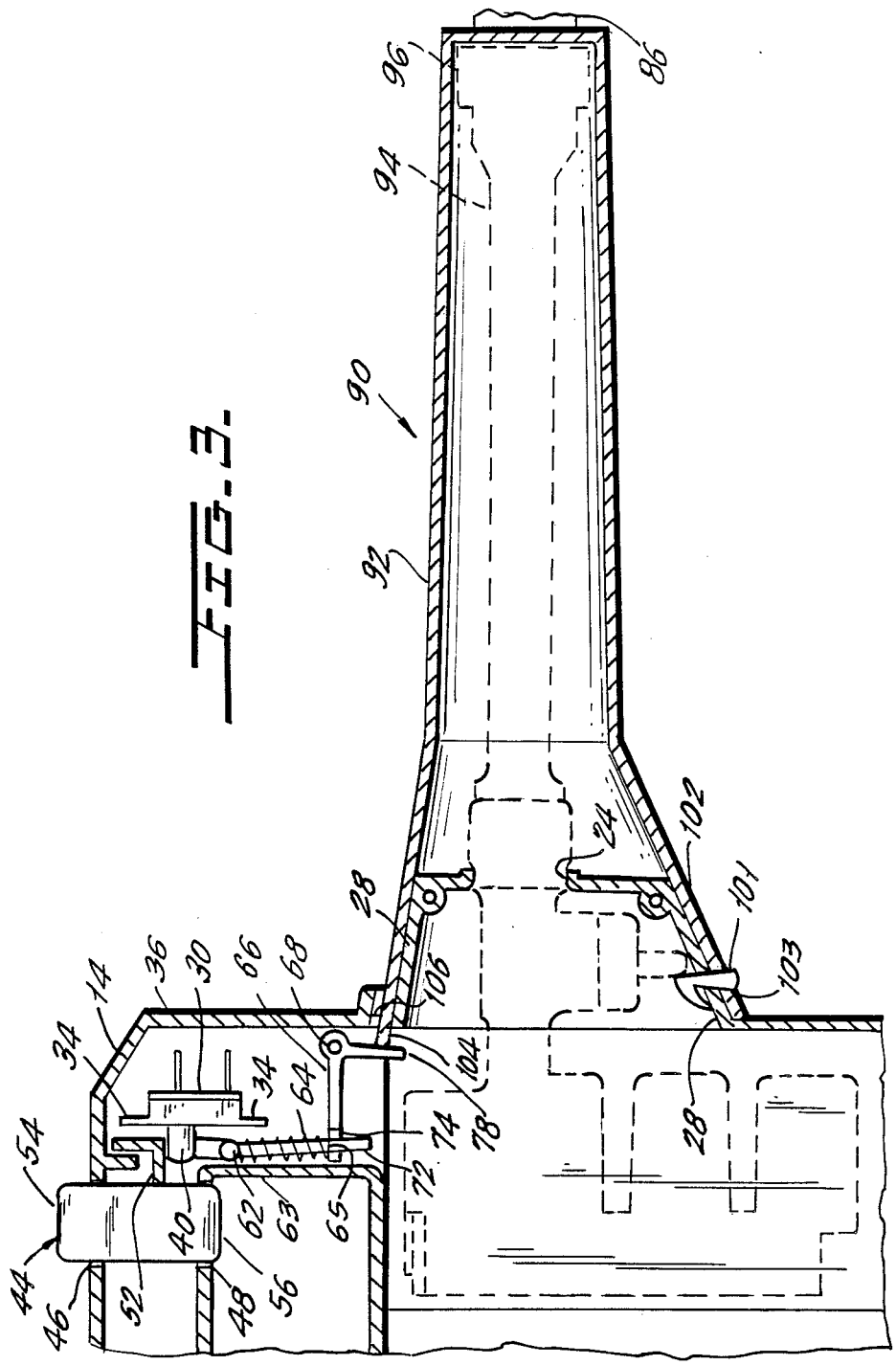

OPERATIONAL MODE CONVERSION FOR PRESSURE WASHER SPRAY

BACKGROUND OF THE INVENTION

The present invention relates to selective switching of a pump of a spray apparatus from continuous operation to intermittent manual operation. The invention has particular use in conjunction with spray apparatus in the form of a pressure washer, like that disclosed in U.S. patent application Ser. No. 297,620 filed Jan. 17, 1989.

A pressure washer is a relatively small size liquid pumping apparatus which delivers liquid at high pressure through its outlet. The pressure of the sprayed liquid is relied upon for its cleaning and spraying functions. Pressure washers are typically operated by electric pumps, although fuel operated pumps may be used. There are various known controls for the flow through the pressure washer outlet, including controls for selectively turning on and off the pump of the pressure washer and/or a valve in the outlet from the pressure washer, typically at or toward its spray nozzle, which is manually operable by the operator to selectively permit or block the outlet flow.

Where the pressure washer pump continues to operate while the outlet spray nozzle valve is closed, the liquid that is being pumped, but that is not then being sprayed out, must be accommodated. Typically, that liquid still being pumped is recycled to an earlier location in the liquid flow pathway, upstream of the pump, to be recirculated to the pump. When the outlet spray nozzle is open, recirculation stops and the liquid is sprayed out. Recirculating means are known for pressure washers, and they are not detailed herein.

The pressure washer with which the present invention is employed includes a pump and apparatus, not disclosed in detail herein, for pumping and supplying a spray of water or a mixture of water with a cleaning liquid upon activation of an electric pump. There is an outlet from the pressure washer to which is connected a selected outlet conduit, which terminates in a spray nozzle. A switch on the pressure washer is operable by the user of the pressure washer to activate the pump. The switch is operated by a manually operable button. When that button is manually moved in one direction, the switch closes a circuit to activate the electric pump. When that button is moved in the opposite direction, the switch opens the circuit to deactivate the pump.

SUMMARY OF THE INVENTION

It is the primary object of the present invention to provide means for controlling the operation of the pump of a pressure washer, or the like liquid spraying apparatus.

It is another object of the invention to provide controlling means selectively adjustable between enabling continuous operation of the pump without continuous operator intervention or intermittent operation of the pump, wherein the operator must continuously activate the pump or it will stop pumping.

It is a further object of the invention to provide such selectivity with different outlet means permitting the spraying by the pressure washer.

The invention is particularly concerned with means for converting the pressure washer between two modes of operation. In the first mode, the pressure washer pump is activated continuously by the operator of the pressure washer moving the switch operating button to the pump activated condition, and that button remains in the pump activated condition until the operator again moves the switch operating button to switch off the pump. In the second mode of operation, the switch and the switch operating button are normally biased to the pump inoperative position. The operator manually moves the switch operating button to the pump activated condition. But, the operator must manually maintain the switch operating button in the pump activated position to keep the pump operating. Release of the switch operating button permits a biasing means to operate on the switch and on the button to return them to the pump inactivated position.

The present invention provides means associated with different selected detachable mounted outlet conduits from the pressure washer for changing between the above described first and second modes of operation. Mounting a first outlet conduit on the pressure washer outlet moves the pump activating switch and the operating button for that switch to the first mode of continuous pump operation without need for continuous operator pressure on the button for the switch. Mounting a different second outlet conduit on the pressure washer outlet shifts the pump switch and its operating button to the second operative mode where the pump is activated only while the button is being manually held by the operator at the pump activated position and the pump is deactivated when the operator releases the operating button for the switch.

The two modes of operation of the pressure washer are contemplated for different techniques of using the same pressure washer. In a first technique of use, the pressure washer is contemplated to be nonportable in use, although certainly movable, and to be placed near the site where spraying is to be done. The outlet conduit leading from the pressure washer outlet is a relatively elongate flexible hose, which terminates at a hand held lance, and the liquid passage through the lance terminates at a spray nozzle at the end of the lance. The operator moves the lance to a convenient location and aims the outlet nozzle of the lance to direct the spray. The operating button for the pump is on the pressure washer unit, not on the lance. Consequently, in this first mode of operation the operator would operate the switch using the button to activate the pump, and the switch would remain in the pump activated condition without the operator having to continuously operate the button. Because the pump is operated continuously, the lance has a separate manually operable spray permitting or blocking valve in the liquid path. The pump operates continuously regardless of whether the valve at the lance is opened or closed. The liquid being pumped but not sprayed when the lance outlet is closed is recirculated to the pump inlet.

In the second mode of operation, the pressure washer unit itself is portable in use and is carried by the operator. A short length rigid outlet conduit is attached to the pressure washer outlet. That outlet conduit might be a rigid lance with a fixed aim direction for its spray nozzle. To direct the spray from that spray nozzle, the operator aims the entire pressure washer unit. Because the pressure washer unit is being carried, the switch operating button is at the operator's hand. The switch is moved to the pump activating condition only when the operator manually operates the button. Biasing means at the switch and at the operating button return the switch to the pump inactivated condition when the operator does not operate the switch button to activate the pump. In this second mode, the pump is being turned on only when the spray is desired. There is not a continuously pumped liquid flow which is released by operating a valve at the lance.

The switch for the pump includes an operating lever which shifts in one direction for activating the pump and in the opposite reciprocal direction for deactivating the pump. Preferably, a slide switch having an operable slide lever is provided. The manual operating button is connected with the operating lever of the switch, and the button is moved to move the operating lever between its two positions. Biasing means in the form of a spring is connected with the operating button and switch lever combination.

Means which are located in the pressure washer are connected with the switch and with the operating button for the switch for selecting one of the two modes of pressure washer operation. Those means on the pressure washer cooperate with different fittings or fixtures on different outlet conduits that are selectively applied to the outlet from the pressure washer. One fitting on one type of outlet conduit does not operate the biasing means to push the switch to return to the pump inactivated condition, while another fixture on a different type of conduit operates the biasing means to push the switch to the pump inactivated condition.

In the first mode of operation, where the pressure washer unit is not being continuously carried or attended by the operator and where the operator uses the valve at the lance to permit or prohibit spraying, the biasing means or spring is not tensioned. When the switch operating button is moved to the pump activated condition, the switch operating button stays there without further operator intervention. When the operator wishes to halt the pumping, the operator manually moves the operating button back to the pump inactivated position.

In the second mode of operation, there is a fitting on the outlet conduit that is so shaped that when the conduit is applied to the pressure washer, the fitting engages and pushes the biasing means to apply a continuous force to the switch lever and the operating button to bias the switch to return to the pump inactivated condition.

In a particular embodiment, the biasing means comprises a spring connected at one end to the combination of the operating button and the switch lever and supported at the other end on a movable shelf. In the second mode of operation, the shelf is upraised by the installation of the conduit fitting on the pressure washer, and the shelf in turn compresses the spring which urges the switch lever and the operating button to the pump inactivated condition.

The foregoing and other objects and features of the present invention will become apparent from the following description of a preferred embodiment of the invention considered in conjunction with the accompanying drawings.

BRIEF DESCRIPTION OF THE DRAWINGS

FIG. 3 is the same view as FIG. 2 showing the same pressure washer in a second pump operation mode requiring operator activation of the switch for operating the pump.

DESCRIPTION OF THE PREFERRED EMBODIMENT

Figure 1:
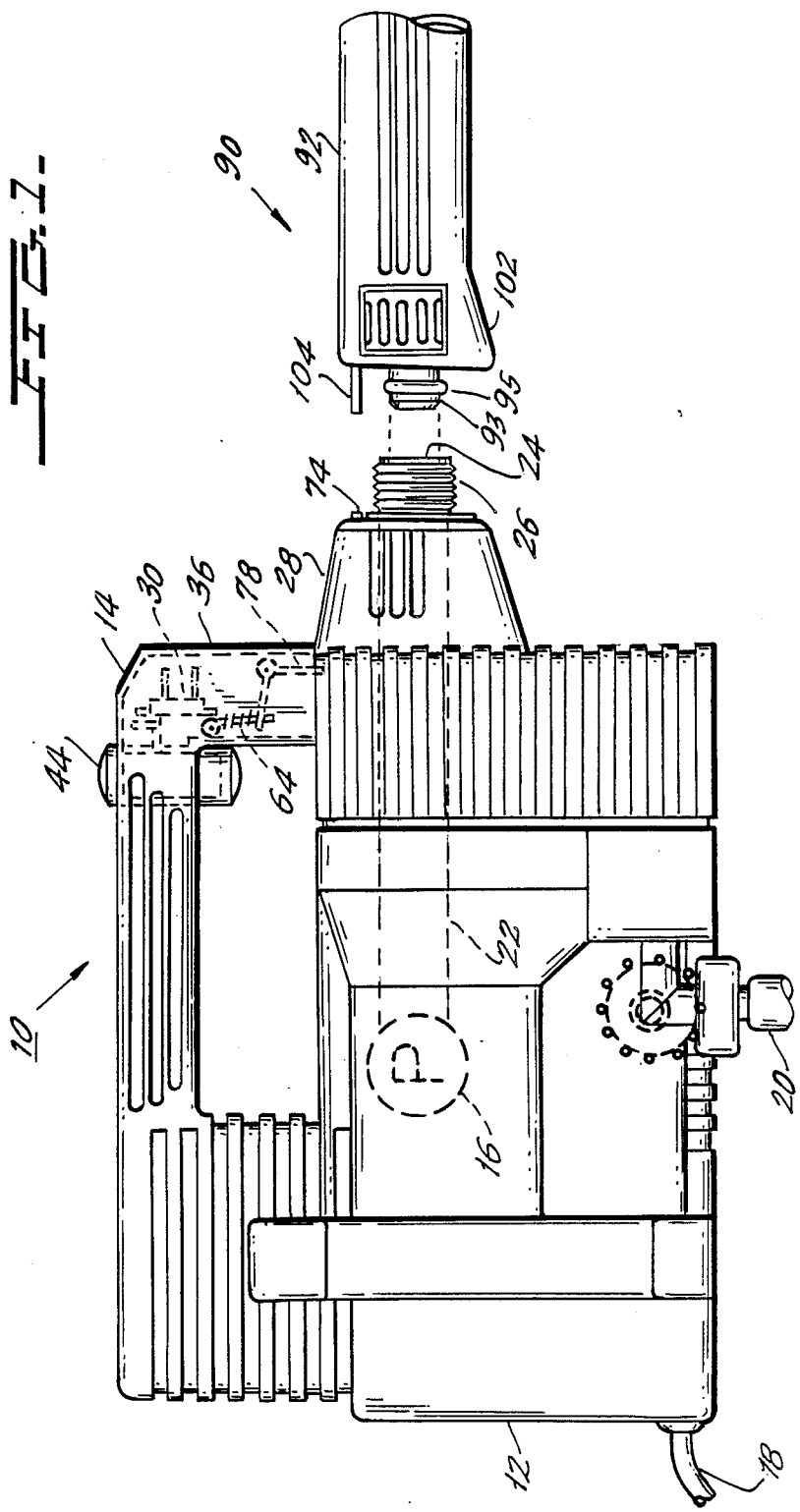
FIG. 1 is a side view of a pressure washer adapted for including the present invention.

Referring to FIG. 1, a pressure washer 10 according to a preferred embodiment of the invention includes a body 12, a handle 14 by which an operator may lift the body 12, an electric pump means 16 within the body 12 of a type known for use with pressure washers, an electric source 18 from outside the pressure washer and connected to the pump for powering it, a water or liquid supply conduit 20 to the pressure washer and communicating with the pump for supplying water to be pumped. An outlet pipe 22 from the pump delivers water under pressure to the open ended outlet nozzle 24, which is surrounded by the screw fitting 26. The fitting 26 is defined on the forwardly projecting support and connector block 28.

Figure 2:
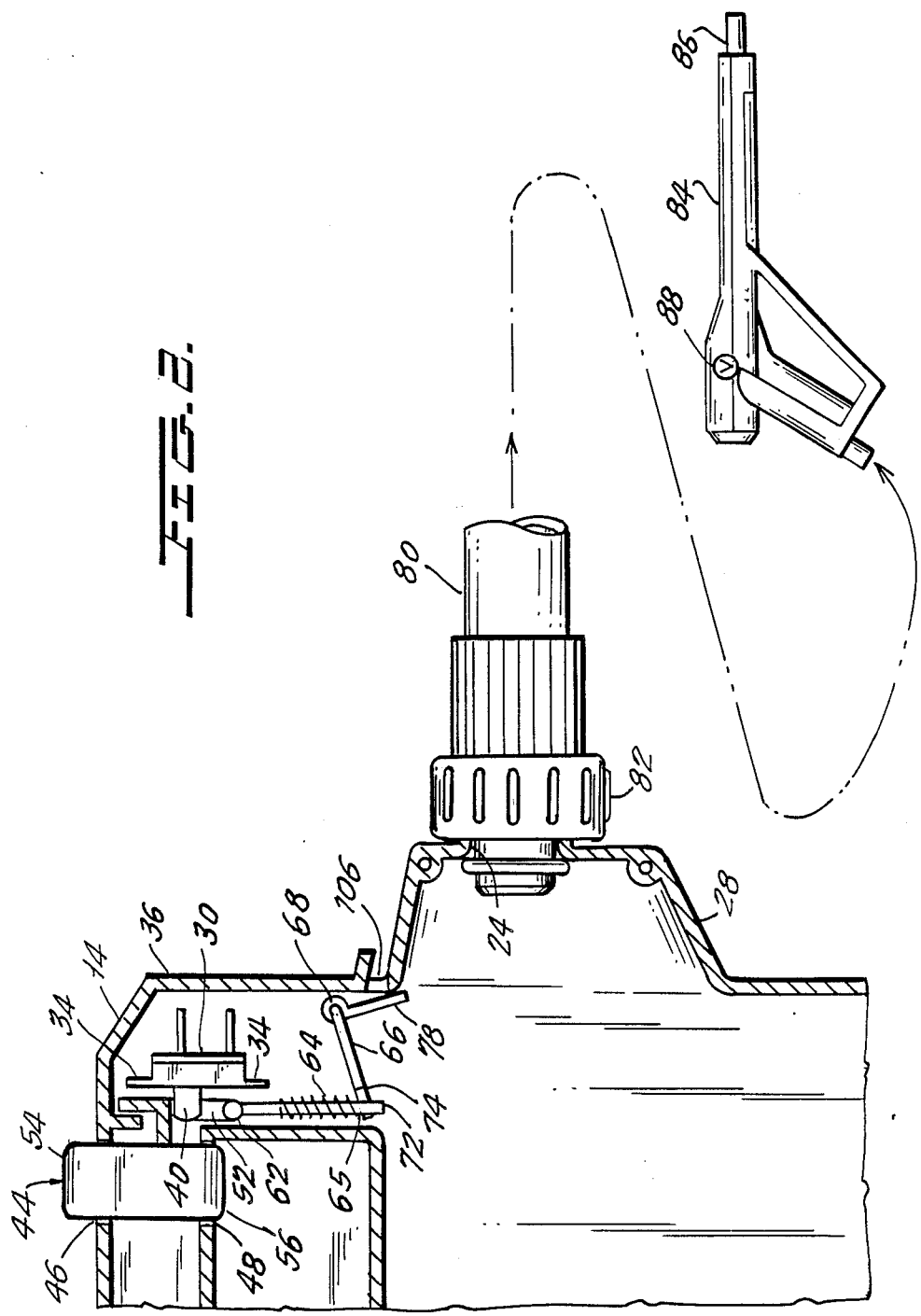
FIG. 2 is a partial cross-sectional view through the outlet end of the pressure washer in a first continuous pump operation mode.

The pump 16 is in electric circuit with a conventional slide switch 30. Referring to FIG. 2, the switch 30 is oriented and anchored by its housing and support flanges 34 in the portion 36 of the handle 14. The switch 30 includes standard switch contacts, not shown, within its housing. For operating the switch contacts there is a slide lever 40 which is slidable or reciprocable up and down in FIG. 2. When the slide 40 is up, the switch contacts to the pump are open and the pump is off. When the slide 40 is down, the switch contacts to the pump are closed and the pump is operating.

A switch operating button 44 is supported for moving vertically through openings 46, 48 in the top and bottom walls of the handle 14. The button includes a connecting fixture 52 on its side which extends to and engages the switch slide 40 so that as the button 44 is reciprocatingly moved up and down, the button moves the switch slide 40 along with it in the same direction. The button 44 has a top end 54 which is pressed to move the button down, which moves the slide 40 of the switch 30 to the pump activated condition. The button 44 has a bottom end 56. If an operator pushes up on the bottom end 56, it raises the button 44 which moves the slide 40 to move the switch to the pump inactivated condition.

There is also connected to the button 44 and the switch slide 40, through the connecting means 52, the upper end abutment 62 for the spring 64. When the upper end 63 of the spring 64 pushes up on the abutment 62, it urges the button 44 and the slide 40 of the switch 30 upwardly to the pump inactivated condition.

The bottom end 65 of the spring 64 rests atop the pivotable shelf 66. That shelf is pivotally connected at pivot 68 to the interior of the handle 14 and the spring rests on the shelf away from the pivot. When the shelf 66 is pivoted clockwise around the pivot 68, the shelf is raised against the bottom end 65 of the spring 64, which urges the spring upwardly to engage the abutment 62, compresses the spring after it engages the abutment and causes the upper end 63 of the spring to push up on the abutment 62. A spring supporting and guiding post 72 extends pivotally from the abutment 62 through the clearance opening 74 in the shelf 66. The spring 64 is wrapped about the post 72 and the post guides the spring 64 so that it might function.

The shelf 66 is normally pivoted down, counterclockwise, as in FIG. 2, and the weight of the shelf and of the spring are sufficient that the shelf 66 would not normally pivot upwardly.

There is affixed to the shelf 66 a shelf activator 78. For raising the shelf 66, the activator 78 is contacted and pushed to the left, from the position in FIG. 2 to that shown in FIG. 3, which pivots the activator 78 and the shelf 66 clockwise and raises the spring 64 so that it presses upon the abutment 62 and biases the switch slide 40 and the button 44 upwardly.

In one mode of operation of the pressure washer shown in FIG. 2, the switch slide 40 is operated only manually up and down by the button 44. In this mode, the spring 64 is out of the way, and provides no obstacle to movement of the button 44 up and down. The movement of that button determines the position of the switch slide 40.

For this mode of operation, the outlet conduit from the pressure washer outlet 24 comprises a hose 80 with a fitting 82 that is internally threaded to be screwed onto the fitting 26 around the outlet 24 from the pressure washer. The hose 80 leads to the lance 84 with the outlet spray nozzle 86 at its end and the on off flow valve 88 therein. The valve 88 is manually trigger operated into its opened and closed conditions for selectively spraying liquid or not spraying liquid, while the pump 16 is operating continuously. In FIG. 2, the shelf 66 is down, and the spring 64 is not pressing against the abutment 62. To activate the pump, the operator simply presses down on the button 44, which shifts the switch slide 40 to the pump activating condition. Because the switch slide is not biased to return motion, the pump remains activated without the operator having to continuously press upon the end 54 of the button 44. When the operator wishes to deactivate the pump, the operator presses up on the bottom 56 of the switch operating button, which raises the slide lever 40 and deactivates the pump 16.

For achieving the second mode of operation shown in FIG. 3, the outlet conduit 90 is not a simple flexible hose leading to the lance. The conduit 90 is instead a stiff housing 92. Projecting rearwardly from the housing 92 is an inlet conduit 93, which is installed in the opening at outlet 24 and that connection is liquid sealed by the flexible O-ring 95 around the fitting 93. The housing 92 has a flow conduit 94 within it leading from its own inlet 93 at the nozzle 24 of the pressure washer to the outlet 96 of the conduit 90. The spray nozzle 86 is of the same design as in the other embodiment and is plugged into the outlet 96 from the conduit 94.

The housing 92 need have no liquid outflow controlling means, as flow would be controlled only by the switch operating button 44, the switch slide lever 40 and the spring 64, as described below.

The stiff housing 92 includes an enlarged cowling 102 at its inlet end, which cowling fits over the exterior of the connector block 28, and this provides mechanical support for the stiff housing 92. As a result, the operator can direct the spray nozzle 96 by aiming the housing 12 of the pressure washer.

To prevent the cowling 102 from blowing off the block 28 under liquid pressure and to hold the conduit 93 in the outlet 24, a spring loaded button 101 at either side of block 28 projects through holes 103 in the cowling wall when the cowling has been installed to hold it on the block 28. Releasing the conduit 90 involves depressing the buttons 101 to free their connection with the cowling 102.

The cowling 102 has at its upper side a rearwardly projecting, biasing spring activator extension or tang 104. When the cowling 102 is mounted on the housing connector block 28, the tang 104 is long enough to pass through the tang entry orifice 106, which is defined on the front wall of the handle portion 36. The orifice 106 and the tang 104 are so placed and oriented that the tang presses against and pivots clockwise the tang engaging shelf activator 78, which pivots and raises the shelf 66, as shown in FIG. 3. When the shelf is raised, it presses up on the bottom end 65 of the spring 64, which raises the top end 63 of the spring for the first time into engagement against the abutment 62 on the switch connector 52. That in turn biases the slide 40 and the abutment 44 upwardly. For the operator of the pressure washer to operate the switch 30 to activate the pump, the operator presses down upon the upper end 54 of the switch operating button 44. When the operator removes his pressure from the button end 54, the button 44 and the switch slide 40 are both biased up by the spring 64 and that deactivates the pump 16. Thus, with the stiff housing 92 attached on the body 12 of the pressure washer, only a single control at the button 44 turns on and off the flow of liquid from the outlet 24 and 96.

In the present invention, therefore, the switching between one mode of continuous operation without the operator having to apply his hand to the push button for the pump switch and a second mode of intermittent operation caused only by the operator holding the push button of the switch is determined by selection of a particular configuration outlet conduit leading to the spray nozzle.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. Variable control means for causing the operation of a liquid spraying apparatus:
   the spraying apparatus comprising:
   a pump for pumping liquid, an outlet from the pump defining an outlet from the apparatus;
   a switch connected with the pump for activating and deactivating the pump, the switch including a switch lever which is movable in a first direction from an off position where the switch inactivates the pump to an on position at which the switch is connected for activating the pump to pump liquid out at the outlet, the switch lever being also movable in a second opposite direction to the off position;
   a switch operating button supported at the apparatus and connected with the switch lever, and the button being movable in an activating direction for moving the switch lever in the first direction to activate the pump, the switch operating button being movable in the opposite inactivating direction for moving the switch lever in the second direction for deactivating the pump;
   biasing means positioned for selective connection to the switch lever for then biasing the switch lever to move in the second direction deactivating the pump and the biasing means further returning the switch operating button in the inactivating direction;
   movable means selectively movable into engagement with the biasing means for urging the biasing means into the selective connection with the switch lever for moving the switch lever in the second direction, and the movable means further being selectively movable out of engagement with the biasing means, for permitting the biasing means to move out of its connection with the switch lever;

wherein with the biasing means connected with the switch lever, activation of the pump requires continuous operation of the switch operating button toward the switch activating direction and upon release of such operation of the switch operating button, the biasing means returning the switch operating button to the pump inactivating position and the switch lever to the off position; and with the biasing means not connected with the switch lever, the switch operating button being movable in the pump activating direction and remaining there after the switch operating button has been moved, and the switch operating button being returnable in the pump inactivating direction only when the switch operating button is operated in the pump inactivating direction.

2. The apparatus of claim 1, further comprising a liquid carrying conduit selectively attachable to the apparatus and separable therefrom, the conduit having a liquid flow passage therethrough having an inlet for communicating with the outlet from the apparatus when the conduit is mounted to the apparatus, and the conduit having an outlet for liquid transmitted through the conduit from the outlet of the apparatus.

3. The apparatus of claim 2, wherein the movable means for urging the biasing means toward connection with the switch lever comprises a first element attached on the conduit and extending into engagement with the biasing menas, such that when the conduit is installed on the apparatus, the first element engages the biasing means and urges the biasing means toward connection with the switch lever for biasing the switch lever;

whereby the conduit installed at the apparatus causes the switch operating button to be operable in the pump activating direction only when the button is continuously operated in that direction, and the absence of the conduit from the apparatus enables the switch operating button to be moved to the pump activating position and permits that button and the switch lever to remaining at the pump activating and on position without the operating button being continuously operated in the pump activating direction.

4. The apparatus in claim 3, further comprising a second conduit connectable on the apparatus, the second conduit having a second inlet, a second liquid flow passage from the second inlet and through the second conduit and having a second outlet receiving liquid from the second conduit for spraying the liquid;

the second conduit remaining out of engagement with the biasing means when the second conduit is mounted to the apparatus;

the first and the second conduits being selectively mountable and dismountable from the apparatus.

5. The apparatus of claim 4, further comprising a liquid flow controlling valve in the second conduit operable for selectively permitting flow therepast to the second outlet and for blocking flow therepast to the second outlet.

6. The apparatus of claim 3, wherein the movable means further comprises a pivot in the housing and a plate pivotably supported at the pivot in the housing; at a location spaced from the pivot, the plate engaging the biasing means; the first element on the conduit for connecting with the biasing means engages the plate for pivoting the plate in a direction for pressing the biasing means for urging the switch lever to the off position and the switch operating button toward the pump inactivating position thereof.

7. The apparatus of claim 1, wherein the movable means comprises a pivot in the housing and a plate pivotably supported at the pivot in the housing; at a location spaced from the pivot, the plate engaging the biasing means; the plate being pivotable in a direction for pressing the biasing means for urging the switch lever to the off position and the switch operating button toward the pump inactivating position thereof.

8. The apparatus of claim 7, further comprising a guide for motion of the biasing means, the guide extending past the plate and the plate being movable with respect to the guide.

9. The apparatus of claim 1, wherein the switch operating button is movable in a reciprocating manner between the pump activating and the pump inactivating positions and the apparatus is shaped for providing access to the switch operating button for enabling its being operated to be reciprocated between the positions thereof.

10. The apparatus of claim 9, wherein the switch lever is mechanically connected with the switch operating button for being moved by motion of the switch operating button along the same directions of motion as the switch operating button.

11. The apparatus of claim 9, wherein the apparatus includes a handle thereon adaptable for being grasped by a person who could use the handle for moving the apparatus;

the switch operating button extending through the handle from one side to the opposite side of the handle, and the switch operating button being operable between the positions thereof by being pushed respectively from one side of the handle or from the other side of the handle.

12. The apparatus of claim 1, wherein the pump is an electric pump and the switch is an electric switch connected with the electric pump for selectively activating and inactivating the pump.

13. The apparatus of claim 1, further comprising an inlet for liquid flow communicating from the exterior of the apparatus and into the pump for supplying liquid to the pump to be pumped.

14. The apparatus of claim 4, wherein the apparatus is a pressure washer and the pump supplies liquid under elevated pressure to the apparatus outlet.

* * * * *